US012807429B2

(12) United States Patent
Park et al.

(10) Patent No.: US 12,807,429 B2
(45) Date of Patent: Nov. 24, 2026

(54) TRANSPORT DEVICE FOR TRANSPORTING BATTERY CELL FILLED WITH ELECTROLYTE

(71) Applicant: LG Energy Solution, Ltd., Seoul (KR)

(72) Inventors: Jong Woo Park, Daejeon (KR); Pyoung Sung Pae, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 421 days.

(21) Appl. No.: 18/712,013

(22) PCT Filed: Jul. 11, 2023

(86) PCT No.: PCT/KR2023/009843
§ 371 (c)(1),
(2) Date: May 21, 2024

(87) PCT Pub. No.: WO2024/019395
PCT Pub. Date: Jan. 25, 2024

(65) Prior Publication Data

US 2025/0019184 A1 Jan. 16, 2025

(30) Foreign Application Priority Data

Jul. 21, 2022 (KR) ........................ 10-2022-0090528

(51) Int. Cl.
*B65G 47/90* (2006.01)
*H01M 10/04* (2006.01)
*H01M 50/105* (2021.01)

(52) U.S. Cl.
CPC ........ *B65G 47/90* (2013.01); *H01M 10/0404* (2013.01); *H01M 50/105* (2021.01)

(58) Field of Classification Search
None
See application file for complete search history.

(56) References Cited

U.S. PATENT DOCUMENTS 5,786,980 A * 7/1998 Evans ................. H01M 50/271
220/228
10,193,181 B2 * 1/2019 Niwa .................. H01M 50/291
(Continued)

FOREIGN PATENT DOCUMENTS

JP 2013165036 A 8/2013
JP 2013206691 A 10/2013
(Continued)

OTHER PUBLICATIONS

International Search Report for PCT/KR023/009843 mailed Oct. 26, 2023. 3 pages.

*Primary Examiner* — Kavel Singh
(74) *Attorney, Agent, or Firm* — Lerner David LLP

(57) ABSTRACT

A transporting device for transporting a pouch battery cell filled with electrolyte, wherein by including a vertical guide for supporting the pouch cell, a gripper for fixing the surface of the pouch cell by the weight of the pouch cell, and a pressurizing part for controlling the fluid motion of the electrolyte injected therein, the transporting device has the advantage that the fluid motion of the electrolyte can be reduced during transportation of the pouch cell, and has an excellent effect of improving the phenomena of interfacial delamination of the electrode and the separator, folding phenomenon of the separator, and the like.

10 Claims, 2 Drawing Sheets

(56) References Cited

U.S. PATENT DOCUMENTS

| | | | | |
|---|---|---|---|---|
| 11,824,228 | B2 * | 11/2023 | Shayan | H01M 50/293 |
| 2015/0000116 | A1 | 1/2015 | Yasooka | |
| 2016/0204462 | A1 | 7/2016 | Kim et al. | |
| 2021/0167461 | A1 | 6/2021 | Lee et al. | |
| 2023/0135483 | A1 | 5/2023 | Hong et al. | |

FOREIGN PATENT DOCUMENTS

| | | | |
|---|---|---|---|
| JP | 2016528710 | A | 9/2016 |
| KR | 20130029941 | A | 3/2013 |
| KR | 20140133140 | A | 11/2014 |
| KR | 20150011736 | A | 2/2015 |
| KR | 20150027689 | A | 3/2015 |
| KR | 20160086196 | A | 7/2016 |
| KR | 101873709 | B1 | 7/2018 |
| KR | 20200101145 | A | 8/2020 |
| KR | 20210003532 | A | 1/2021 |
| KR | 20210011261 | A | 2/2021 |
| KR | 20220083025 | A | 6/2022 |
| KR | 20220099463 | A | 7/2022 |
| KR | 20220099464 | A | 7/2022 |
| WO | 2022031579 | A1 | 2/2022 |

* cited by examiner

[FIG. 1]
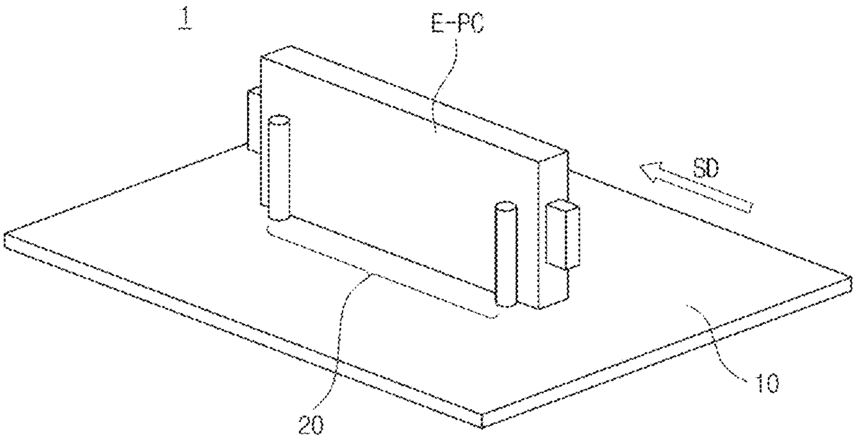
PRIOR ART
[FIG. 2]
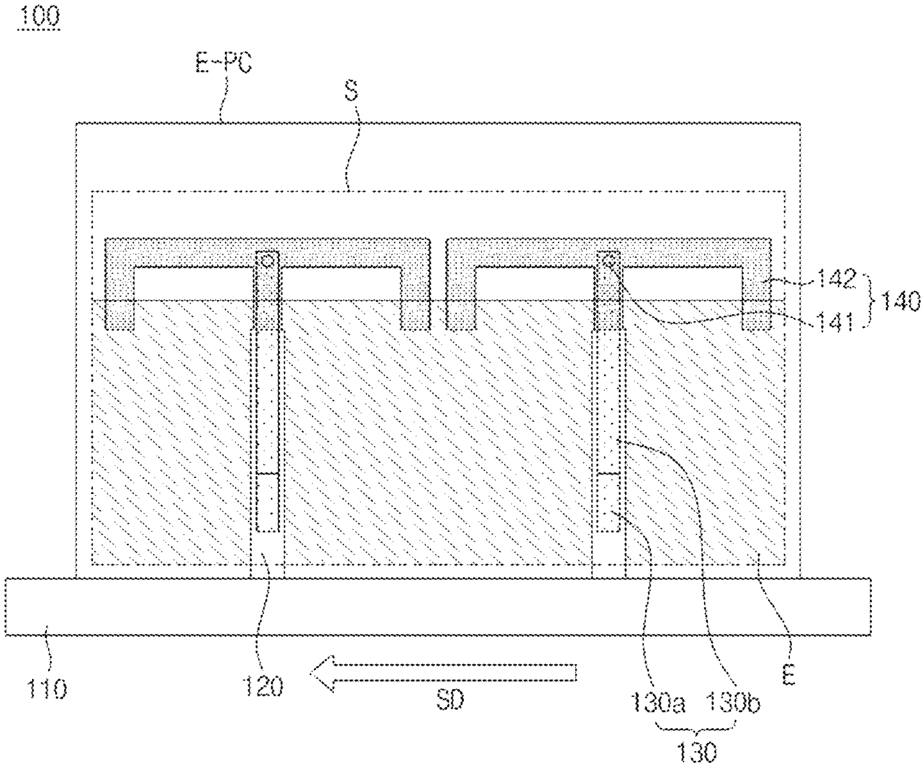

[FIG. 3]
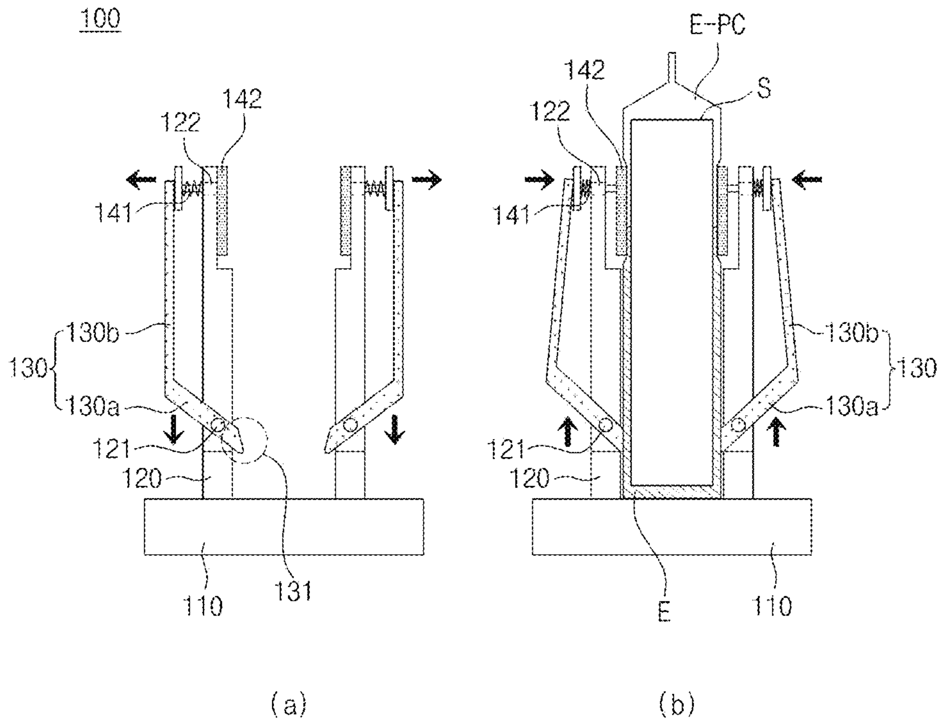
[FIG. 4]
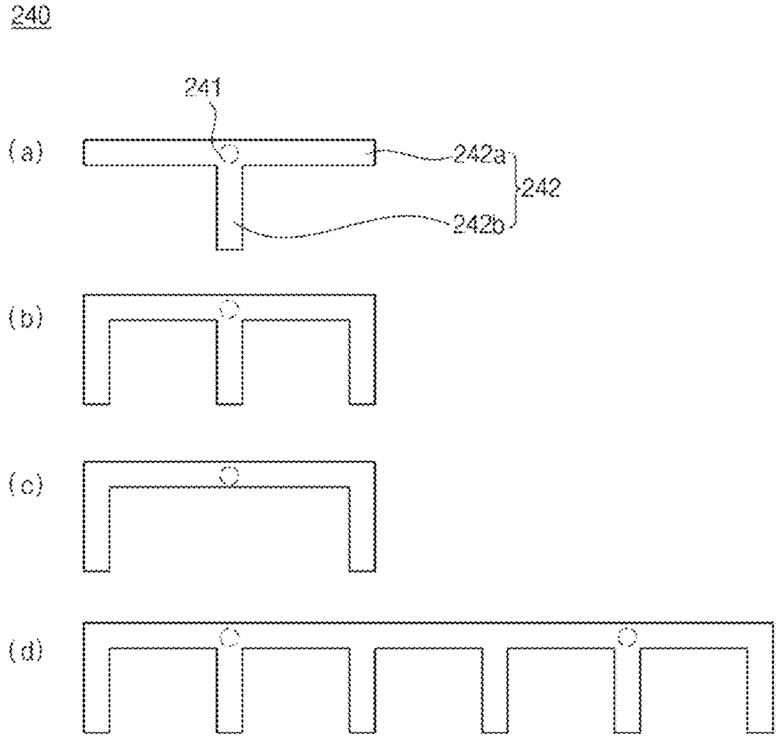

TRANSPORT DEVICE FOR TRANSPORTING BATTERY CELL FILLED WITH ELECTROLYTE

CROSS-REFERENCE TO RELATED APPLICATIONS

This application is a national phase entry under 35 U.S.C. § 371 of PCT/KR2023/009843, filed on Jul. 11, 2023, which claims the benefit of priority based on Korean Patent Applications No. 10-2022-0090528, filed on Jul. 21, 2022, the disclosures of which are incorporated herein by reference in their entireties.

TECHNICAL FIELD

The present disclosure relates to a device for transporting unsealed pouch cells filled with electrolyte.

BACKGROUND

In recent years, secondary batteries have been widely applied in small devices such as portable electronics, as well as in medium and large devices such as battery packs or power storage in hybrid or electric vehicles.

Such a secondary battery is configured by including a battery cell and an electrolyte inside a case. The battery cell consists of a negative electrode and positive electrode, which are alternately stacked and made of materials that allow the intercalation and deintercalation of lithium ions, and a separator, which is inserted between the negative electrode and positive electrode to prevent direct contact between the positive electrode and negative electrode.

After the battery cells are inserted inside the secondary battery case and the electrolyte is injected, the secondary battery is stored in a carrier and transported to the desired location for further processes, such as sealing the side parts of the case. The storage and transportation of these secondary batteries is automated.

At this time, the electrolyte-filled secondary battery generates fluid motion of the internal electrolyte, such as sloshing, due to the movement and stopping of the carrier during the transportation process. This fluid motion of the electrolyte causes the interface of the electrode and the separator to be delaminated or the separator to be folded into the electrode. This delamination of the electrode and separator interface or folding of the separator leads to short circuit failure due to external exposure of the negative electrode, which leads to a decrease in safety such as ignition of the battery.

DESCRIPTION OF THE DISCLOSURE

Technical Problem

Accordingly, it is an object of the present disclosure to provide a battery cell transport device capable of preventing the phenomenon of interfacial delamination or folding of a separator due to fluid motion of an electrolyte solution when transporting a secondary battery filled with an electrolyte before sealing, and a method for manufacturing a battery cell using the device.

Technical Solution

To address the problems described above,

In one exemplary embodiment, the present disclosure provides a transport device for secondary batteries for transporting unsealed pouch cells filled with electrolyte, comprising:

a transporting part for transporting a pouch cell, and a gripping part coupled to the transporting part and fixing the pouch cell, wherein the gripping part includes: a main body on which the pouch cell is mounted; a vertical guide disposed vertically in pairs parallel to each other on an upper surface of the main body to support both sides of the pouch cell; a gripper actuated by a weight of the pouch cell inserted between a pair of vertical guides by having its lower end part connected to the lower part of the vertical guide; and a pressurizing part connected to an upper end part of the gripper to pressurize the surface of the pouch cell.

Here, the pressurizing part may include: a pressurization guide located on an inner side of the vertical guide and controls a fluid motion of the electrolyte by pressurizing the surface of the pouch cell; and an elastic member disposed between the upper end part of the gripper and the pressurization guide.

In addition, the vertical guide may include an upper through-hole, and the pressurization guide may be coupled to the upper end part of the gripper via a connecting part inserted to the upper through-hole.

Moreover, the pressurization guide may include: a first guide bar disposed horizontally with the main body of the gripping part and coupled to the connecting part; and one or more second guide bars extending downwardly from the first guide bar.

Here, the first guide bar may be positioned at a height equal to or higher than a height of the electrolyte injected inside the pouch cell.

In addition, the pressurization guide may include, on a pressurized surface that abuts the pouch cell, a material including one or more selected from the group consisting of epoxy resin, silicone, styrene-based rubber, butadiene-based rubber, polyurethane, flexible PVC, and polypropylene copolymer.

Meanwhile, the vertical guide may include a lower through-hole.

Additionally, the gripper may comprise: a first frame including a protruding part inserted into the lower through-hole of the vertical guide in a diagonal direction relative to the vertical guide and protruding inwardly to the vertical guide; and a second frame bending connected to the other end of the first frame having the protruding part to be horizontal with the vertical guide, and connected to the pressurizing part that presses against the upper surface of the pouch cell at the other end of the end connected to the first frame.

Furthermore, the protruding part is arranged to contact the pouch cell, and may implement a lifting movement of the first frame in response to a change in weight of the pouch cell when in contact or not in contact with the pouch cell.

Here, the protruding part may have a structure coated with one or more resins selected from the group consisting of epoxy, silicone, styrene-based rubber, butadiene-based rubber, polyurethane, flexible PVC, and polypropylene copolymer.

Advantageous Effects

A transporting device according to the present disclosure includes a vertical guide supporting a pouch cell; a gripper for fixing a surface of the pouch cell by the weight of the pouch cell; and a pressurizing part for controlling the fluid motion of an electrolyte injected therein, so it has an advantage of reducing the fluid motion of the electrolyte when the pouch cell is transported, thereby has an excellent effect of improving a phenomenon such as an interfacial delamination of an electrode and a separator, a folding phenomenon of a separator, etc. caused thereby.

BRIEF DESCRIPTION OF THE DRAWINGS

FIG. 1 is a perspective view of a gripping part of a transport device used to move a conventional electrolyte-filled pouch cell.

FIG. 2 is a plan view illustrating the structure of a transport device according to the present disclosure.

FIGS. 3(*a*) and (*b*) are cross-sectional views illustrating the structure of a transport device of the present disclosure depending on whether the pouch cell is inserted or not.

FIG. 4(*a*)-(*d*) are structural diagrams illustrating examples of a pressurization guide according to the present disclosure.

BEST MODE FOR CARRYING OUT THE DISCLOSURE

The present disclosure may have various modifications and various examples, and specific examples are illustrated in the drawings and described in detail in the description.

However, it should be understood that the present disclosure is not limited to specific embodiments, and includes all modifications, equivalents or alternatives within the spirit and technical scope of the present disclosure.

The terms "comprise," "include" and "have" are used herein to designate the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance.

In addition, when a part of a layer, a film, a region or a plate is disposed "on" another part, this includes not only a case in which one part is disposed "directly on" another part, but a case in which a third part is interposed there between. In contrast, when a part of a layer, a film, a region or a plate is disposed "under" another part, this includes not only a case in which one part is disposed "directly under" another part, but a case in which a third part is interposed there between. In addition, in this application, "on" may include not only a case of disposed on an upper part but also a case of disposed on a lower part.

Hereinafter, the present disclosure will be described in more detail.

Transport Device

In an exemplary embodiment, the present disclosure provides a transport device for secondary batteries including a transporting part for transporting a pouch cell, and a gripping part coupled to the transporting part and fixing the pouch cell, wherein the gripping part includes a main body on which the pouch cell is mounted; a vertical guide disposed vertically in pairs parallel to each other on the upper surface of the main body to support both sides of the pouch cell; a gripper actuated by the weight of the pouch cell inserted between a pair of vertical guides by having its lower end part connected to the lower part of the vertical guide; and a pressurizing part connected to the upper end part of the gripper to pressurize the surface of the pouch cell.

The transport device according to the present disclosure may be used for inter-process transport during manufacture of secondary batteries, and more specifically, in the assembly of pouch-shaped secondary batteries, may be used when transporting in a state where the electrolyte is injected into the pouch in which the electrode assembly is inserted without being sealed.

FIG. 1 is a schematic perspective view of a conventional transport device. Referring to FIG. 1, the conventional transport device 1 includes a main body 10 for supporting a pouch cell E-PC at the lower part and moving the supported pouch cell E-PC, and has a structure in which a pair of vertical guides 20 are arranged on an upper surface of the main body 10 for supporting and fixing both sides of the pouch cell (E-PC). While such a conventional transport device 1 is useful for moving the pouch cell E-PC, it has limitations in suppressing the electrolyte fluid motion inside the pouch cell E-PC, i.e., the sloshing of the electrolyte, caused by the movement of the pouch cell E-PC.

However, the transport device according to the present disclosure may control the fluid motion of the electrolyte within the pouch cell E-PC by having a gripper including a pressurization guide that fixes both sides of the pouch cell E-PC by the weight of the pouch cell E-PC to a vertical guide supporting an unsealed pouch cell E-PC filled with electrolyte. More specifically, FIGS. 2 and 3(*a*)-(*b*) is a plan view and a cross-sectional view schematically illustrating a structure of a transport device according to the present disclosure. Referring to FIGS. 2 and 3(*a*)-(*b*), a transport device according to the present disclosure includes a transporting part (not shown) for transporting a pouch cell E-PC, and a gripping part 100 coupled to the transporting part and fixing the pouch cell E-PC. The gripping part 100 includes: a main body 110 on which the pouch cell E-PC is mounted; and vertical guides 120 vertically disposed in pairs parallel to each other on an upper surface of the main body 110 to support both sides of the pouch cell E-PC; a gripper 130 connected to a lower end part of the vertical guides 120 and actuated by the weight of a pouch cell E-PC inserted between the pair of vertical guides 120; and a pressurizing part 140 connected to an upper end part of the gripper 130 to press a surface of the pouch cell E-PC.

Here, the main body 110 and vertical guide 120 serve to support the unsealed pouch cell E-PC filled with electrolyte in a longitudinal direction so that it is transported in an upright position. For this purpose, the main body 110 may be located at the lower part of the pouch cell E-PC to support the pouch cell E-PC; and may have a structure that transports the pouch cell E-PC supported at the upper part by being engaged with a transporting part (not shown) including a conveyor belt and a drive roller for rotating the conveyor belt for transporting the pouch cell E-PC. The main body 110 may be applied without limitation as long as it supports the pouch cell at the lower part of the pouch cell E-PC and is engaged with the transporting part.

Furthermore, the vertical guides 120 may be disposed in a left and right pair on the upper surface of the main body 110. The left and right pair of vertical guides 120 may form a compartment between them in the form of an open upper part and a closed lower part, in which the pouch cell E-PC may be stored and supported. Here, the vertical guides 120 are not particularly limited as long as they are of a structure capable of supporting the pouch cell E-PC.

In one example, the vertical guide 120 may have the form of a pair of vertical guide bars, as shown in FIGS. 2 and 3(*a*) and 3(*b*). In this case, the vertical guide bars may have a shape that is close to the surface of the pouch cell E-PC during storage of the pouch cell E-PC, but spaced apart such that they do not press on the surface of the pouch cell E-PC to prevent the electrolyte injected inside the pouch cell E-PC from leaking out. Furthermore, the vertical guide bars may be provided on the upper surface of the main body 110 in a plurality of pairs, more particularly two or more pairs, more particularly two to five pairs; or two to four pairs, to reduce shaking of the pouch cells E-PC during transportation of the pouch cell E-PC.

As another example, the vertical guide 120 may have the form of a pair of diaphragms. In this case, the diaphragms may be disposed in the center of both sides of the pouch cell E-PC.

In addition, the vertical guide 120 has a configuration for supporting the pouch cell E-PC to stand vertically during transport, and for reducing fluid motion of the electrolyte E injected inside the supported pouch cell E-PC, and specifically, has a structure in which a gripper 130 and a pressurizing part 140 are connected.

The gripper 130 serves to fix the surface of the pouch cell E-PC so that the electrolyte-filled pouch cell E-PC itself can be minimally shaken during transport. In this case, the gripper 130 is connected at its lower end part to the lower end of the vertical guide 120 and is actuated by the weight of the inserted pouch cell E-PC upon insertion of the pouch cell E-PC. To this end, as shown in FIGS. 3(*a*) and 3(*b*), the vertical guide 120 may include a lower through-hole 121 for contacting the inserted pouch cell E-PC with the gripper 130. Specifically, the gripper 130 may include a first frame 130*a* inserted into the lower through-hole 121 in a diagonal direction relative to the vertical guide 120; and a second frame 130*b* connected to the first frame 130*a* and extending in a transverse direction to the first frame 130*a*, and coupled on the outer side of the vertical guide 120 via a pressurizing part 140 at the other end of the end of the second frame opposite the end connected to the first frame 130*a*.

Here, the first frame 130*a* may be inserted diagonally relative to the vertical guide 120 into the lower through-hole 121 provided in the lower part of the vertical guide 120 so that an end of the first frame 130*a* protrudes inwardly to the vertical guide 120 by a predetermined length. This protruding end, i.e., the protruding part 131, can perform a lifting movement by the weight of the pouch cell E-PC inserted into the inner side of the vertical guide 120, thereby fixing the pouch cell E-PC through a side-to-side movement of the upper end part of the gripper 130.

In one example, the protruding part 131 may contact the lower end or lower part of the pouch cell E-PC when the pouch cell E-PC is inserted into the gripping part 100, as shown in FIG. 3(*b*), and may be pressed down by the weight of the pouch cell E-PC to perform a downward movement. The downward movement of the protruding part 131 may induce an upward movement of the other end part of the first frame 130*a* provided with the protruding part 131, i.e., the connecting part with the second frame 130*b*. This upward movement may induce a side-to-side movement of the second frame 130*b* inwardly toward the vertical guide 120, which may press and/or fix the surface of the unsealed pouch cell E-PC.

Conversely, as shown in FIG. 3(*a*), the protruding part 131 may perform an upward movement as the weight of the pouch cell E-PC that was being applied to the lower end or lower part of the pouch cell E-PC disappears when the pouch cell E-PC is removed from the gripping part 100. This upward movement of the protruding part 131 may induce a downward movement of the other end part of the first frame 130*a* provided with a protruding part 131, i.e., the connecting part with the second frame 130*b*. The downward movement may induce a side-to-side movement of the second frame 130*b* outward of the vertical guide 120, thereby removing pressure and/or fixation on the surface of the pouch cell E-PC.

Meanwhile, the protruding part 131 may be rounded, with the end having a tapered shape along the insertion direction of the pouch cell E-PC to prevent damage to the surface of the contacted pouch cell E-PC. Furthermore, in some cases, the surface of the end of the protruding part 131 may be coated with one or more resins selected from epoxy, silicone, styrene-based rubber, butadiene-based rubber, polyurethane, flexible PVC, and polypropylene copolymer. The resin may be clastic to minimize surface damage upon contact of the protruding part 131 with the pouch cell E-PC.

Furthermore, the pressurizing part 140 is provided at the upper end part of the second frame 130*b* of the gripper 130, and can pressurize the surface of the pouch cell E-PC according to the side-to-side movement of the second frame 130*b*, thereby playing a role in controlling the fluid motion of the electrolyte present inside the pouch cell E-PC.

To this end, the pressurizing part 140 may include a pressurization guide 142, which is positioned on the inner side of the vertical guide 120 to pressurize and fix the surface of the pouch cell E-PC and control the fluid motion of the electrolyte E inside the pouch cell E-PC; and an elastic member 141 disposed on an upper end part of a gripper 130, specifically between the upper end part of the second frame 130*b* and the pressurization guide 142.

Here, the vertical guide 120 may include an upper through-hole 122 for coupling a gripper 130 located on an outer side of the vertical guide 120 and a pressureization guide 142 located on an inner side of the vertical guide 120. Furthermore, the pressurization guide 142 may be coupled to an upper end part of the gripper 130, more specifically to an upper end part of the second frame 130*b*, via a connecting part inserted in the upper through-hole 122. In this case, the connecting part may have the form of an elastic member 141 introduced therein. The elastic member 141 may be provided in a connecting part disposed between the gripper 130 and the pressurization guide 142 such that, in the event of a side-to-side movement of the second frame 130*b* of the gripper 130, pressure may be applied directly to the pressurization guide 142 to prevent damage to the inserted pouch cell E-PC, while at the same time, the elastic force resulting from the applied pressure may be applied to the pressurization guide 142 to firmly fix the pouch cell E-PC.

In addition, the pressurization guide 142 performs an action of pressurizing the surface of the pouch cell E-PC when the gripper 130 fixes the surface of the pouch cell E-PC according to the side-to-side movement of the second frame 130*b*.

This pressurization action can minimize the gap between the pouch cell E-PC and the electrode assembly S inside the pouch cell E-PC in the region where the pressurization guide 142 contacts. By doing so, the pressurization guide 142 can inhibit the residual electrolyte E that is not impregnated with the electrode assembly S from inducing fluid motion, such as sloshing, inside the pouch cell E-PC during movement of the pouch cell E-PC.

In this case, the pressurization guide 142 may include a first guide bar disposed horizontally with the main body 110 of the gripping part 100 and coupled to a connecting part including an elastic member 141, and one or more second guide bars extending downwardly from the first guide bar.

The first guide bar may serve to control the movement of the electrolyte E present inside the pouch cell E-PC in the vertical direction, and may be located at a height equal to or higher than the height of the electrolyte E when the pouch cell E-PC is not being transported. By doing so, the first guide bar can prevent overflow of the electrolyte E inside the pouch cell E-PC during transport, and at the same time minimize damage to the side parts of the electrode assembly S that are exposed during transport.

Furthermore, the first guide bar may have an elastic member 141 disposed at its center that connects with the second frame 130*b* of the gripper 130. In this case, the first guide bar can facilitate controlling the fluid motion of the electrolyte E without damaging the surface of the pouch cell E-PC, as the force applied through the elastic member 141 can be evenly distributed throughout the first guide bar.

Furthermore, the second guide bar may extend downwardly from the first guide bar to serve as a barrier to control the horizontal movement of the electrolyte E present inside the pouch cell E-PC upon pressurization of the pressurization guide 142. In this case, the second guide bar may have a form in which one or more second guide bars extend from the first guide bar, and more specifically may have one to five; one to three; or two to four of them extending.

As one example, the pressurization guide 242 according to the present disclosure may have a T-shaped, n-shaped, m-shaped, or other shape with one to three second guide bars 242*b* extending downwardly from the first guide bar 242*a*, as shown in (a) to (c) of FIG. 4.

Furthermore, the pressurization guides 242 may be connected to grippers 130 provided on each of the vertical guides 120 when there are two or more pairs of vertical guides 120 on the main body 110, wherein the connected pressurization guides 242 may have a form coupled to neighboring pressurization guides.

In one example, the pressurization guide 242 according to the present disclosure may be individually connected to a gripper 130 provided on each vertical guide 120 via an elastic member 241 when two pairs of vertical guides 120 are present on the main body 110. The connected pressurization guide 242 may have a form coupled to a neighboring pressurization guide, as shown in FIG. 4(*d*).

In this case, the pressurization guide 242 can more effectively control the fluid motion of the electrolyte E injected into the pouch cell E-PC, particularly the fluid motion of the electrolyte E occurring at the edge of the electrode assembly S, thereby minimizing folding and damage to the separator included in the electrode assembly S.

Furthermore, the pressurization guide 142 may include a material having an elastic force on the pressurization surface in contact with the pouch cell E-PC. Specifically, the pressurization guide 142 may be provided with a sheet, pad, film, or the like comprising a material having an elastic force on the pressurization surface in contact with the surface of the pouch case to minimize surface damage to the pouch cell E-PC. The material is not particularly limited as long as it has elastic force, but specifically may include one or more of epoxy resin, silicone, styrene-based rubber, butadiene-based rubber, polyurethane, flexible PVC, and polypropylene copolymer.

Meanwhile, the elastic member 141 may be introduced in a connecting part located between the second frame 130*b* and the pressurization guide 142 of the gripper 130, and more specifically between the second frame 130*b* and the pressurization guide 142. Accordingly, the elastic member 141 may impart an elastic force upon side-to-side movement of the second frame 130*b* by the weight of the pouch cell E-PC inserted inside the vertical guide 120, thereby enabling the pressurization guide 142 to more firmly fixing the surface of the pouch cell E-PC while preventing damage to the surface of the unsealed pouch cell E-PC due to excessive pressure.

In one example, the clastic member 141 may cause the protruding part 131 of the first frame 130*a* to descend under the weight of the pouch cell E-PC when the pouch cell E-PC is inserted between the pair of vertical guides 120 as shown in FIGS. 3(*a*) and (*b*). At this time, the upper end part of the second frame 130*b* is moved in the inward direction of the vertical guide 120 through a side-to-side movement. In addition, the elastic member 141 located between the upper end part of the second frame 130*b* and the pressurization guide 142 can more firmly fix the inserted pouch cell E-PC through contraction.

Furthermore, the elastic member 141 may include, but is not particularly limited to, a spring, an elastic foam, an elastic structure, or the like, as long as it is capable of imparting an elastic force through contraction and expansion between the second frame 130*b* and the pressurization guide 142.

The transport device according to the present disclosure can reduce the fluid momentum of the electrolyte inside the pouch cell E-PC by having the above-described configuration. Therefore, the transport device has the advantage of reducing the interfacial delamination of the electrode and separator, folding of the separator, etc. caused by the fluid motion of the electrolyte, thereby improving the safety issues of the battery, such as an internal short circuit and cell ignition.

Method for Moving Pouch Cells

Furthermore, in one embodiment, the present disclosure provides a method of moving a pouch cell utilizing a transport device according to the present disclosure.

Specifically, the method of moving the pouch cell may include mounting the pouch cell with the electrode assembly inserted in the pouch cell to a transport device according to the present disclosure prior to electrolyte injection, and operating the transport device with the pouch cell mounted to perform the movement for the electrolyte injection process and the pouch cell sealing process.

The method of moving the pouch cell according to the present disclosure can regulate the sloshing phenomenon of the electrolyte in the pouch cell that occurs during movement using the transport device of the present disclosure, thereby preventing the interfacial delamination of the electrode and the separator, the folding phenomenon of the separator, and the like that occurs internally during movement of the unsealed pouch cell filled with electrolyte.

Hereinafter, the present disclosure will be described in more detail by way of examples and experimental examples.

However, the following examples and experimental examples are only illustrative of the present disclosure, and the present disclosure is not limited to the following examples.

Examples and Comparative Examples

An unsealed pouch cell with an electrode assembly inserted into a battery pouch was prepared, and the prepared pouch cell was mounted on a transport device. Then, the transport device with the pouch cell mounted was used to move the pouch cell to an electrolyte injection device, and electrolyte was injected into the pouch cell. The transport device was then used to move the unsealed pouch cell to the pouch sealing machine, and the electrode assembly and electrolyte were separated from the moved pouch cell to check for folds in the separator and to measure the amount of electrolyte loss. The process was repeated 100 times to calculate the incidence rate of separator folding and electrolyte loss, and the results are shown in Table 1.

Here, for the transport device used to move each pouch cell, one having a gripping part with the structure of FIG. 1 or FIG. 2, as shown in Table 1, was used, and in the case of having a gripping part with the structure of FIG. 2, the shape of a pressurization guide was adjusted to the shape shown in FIG. 4.

TABLE 1

| | Gripping Part Structure | Pressurization Guide Structure | | Incidence rate | |
|---|---|---|---|---|---|
| | | Structure | First Guide Bar Position | Separator Folding | Electrolyte loss |
| Comparative Example 1 | Structure in FIG. 1 | Not included | — | 9 ± 0.5% | 3 ± 0.5% |
| Example 1 | Structure in FIG. 2 | FIG. 4(a) | Lower part of electrolyte interface | 6 ± 0.5% | 1.2 ± 0.5% |
| Example 2 | Structure in FIG. 2 | FIG. 4(a) | Electrolyte interface | 4 ± 0.5% | 0.5 ± 0.5% |
| Example 3 | Structure in FIG. 2 | FIG. 4(a) | Upper part of electrolyte interface | 4 ± 0.5% | 0.5 ± 0.5% |
| Example 4 | Structure in FIG. 2 | FIG. 4(c) | Upper part of electrolyte interface | 2 ± 0.5% | 0 ± 0.5% |
| Example 5 | Structure in FIG. 2 | FIG. 4(d) | Upper part of electrolyte interface | 1 ± 0.5% | 0 ± 0.5% |

As shown in Table 1, it can be seen that the transport device according to the present disclosure reduces fluid motion such as sloshing of electrolyte in an unsealed pouch cell filled with electrolyte, thereby improving folding of the separator and loss of electrolyte.

While the present disclosure has been described with reference to preferred examples, it will be understood by those skilled in the art or having ordinary knowledge of the art that various modifications and changes can be made to the disclosure without departing from the field of thought and technology described in the patent claims that will follow.

Accordingly, the technical scope of the disclosure is not limited to what is described in the detailed description of the specification, but must be determined by the claims of the patent.

[Reference numerals]

| | |
|---|---|
| 1: CONVENTIONAL TRANSPORT DEVICE | 100: GRIPPING PART |
| 10, 110: MAIN BODY | 20, 120: VERTICAL GUIDE |
| 121: LOWER THROUGH-HOLE | 122: UPPER THROUGH-HOLE |
| 130: GRIPPER | 130A: FIRST FRAME |
| 130B: SECOND FRAME | 131: PROTRUDING PART |
| 140 AND 240: PRESSURIZING PARTS | 141 AND 241: ELASTIC MEMBERS |
| 142, 242: PRESSURIZATION GUIDES | 242A: FIRST GUIDE BAR |
| 242B: SEOCOND GUIDE BAR | |
| E-PC: UNSEALED POUCH CELL FILLED WITH ELECTROLYTE | |
| SD: MOVING DIRECTION OF THE POUCH CELL/TRANSPORT DEVICE | |
| E: ELECTROLYTE | |
| S: ELECTRODE ASSEMBLY | |

The invention claimed is:

1. A transport device for transporting an unsealed pouch cells filled with electrolyte, comprising:

a transporting part for transporting the pouch cell, and a gripping part coupled to the transporting part and configured to fix the pouch cell, wherein the gripping part comprises:

a main body on which the pouch cell is configured to be mounted;

a vertical guide including a pair of vertical guides disposed parallel to each other on an upper surface of the main body and configured to support both sides of the pouch cell;

a gripper configured to be actuated by a weight of the pouch cell being inserted between the pair of vertical guides, the gripper having a lower end part connected to a lower part of the vertical guide; and a pressurizing part connected to an upper end part of the gripper and configured to pressurize a surface of the pouch cell.

2. The transporting device of claim 1, wherein the pressurizing part comprises:

a pressurization guide located on an inner side of the vertical guide and arranged to controls a fluid motion of the electrolyte by pressurizing the surface of the pouch cell; and an elastic member disposed between the upper end part of the gripper and the pressurization guide.

3. The transporting device of claim 2, wherein the vertical guide includes an upper through-hole, and the pressurization guide is coupled to the upper end part of the gripper via a connecting part inserted into the upper through-hole.

4. The transporting device of claim 2, wherein the pressurization guide comprises:

a first guide bar disposed horizontally with the main body of the gripping part and coupled to a connecting part; and one or more second guide bars extending downwardly from the first guide bar.

5. The transporting device of claim 4, wherein the first guide bar is configured to be positioned at a height equal to or higher than a height of the electrolyte disposed inside the pouch cell.

6. The transporting device of claim 2, wherein the pressurization guide comprises, on a pressurized surface that is configured to abuts the pouch cell, a material comprising one or more of an epoxy resin, silicone, styrene-based rubber, butadiene-based rubber, polyurethane, flexible PVC, or polypropylene copolymer.

7. The transporting device of claim 1, wherein the vertical guide comprises a lower through-hole.

8. The transporting device of claim 7, wherein the gripper comprises:

a first frame including a protruding part inserted into the lower through-hole of the vertical guide in a diagonal direction relative to the vertical guide and protruding inwardly to the vertical guide; and a second frame connected to the other end of the first frame having the protruding part and extending in a transverse direction to the first frame, and the second frame being connected to the pressurizing part that presses against the upper surface of the pouch cell at the other end of second frame opposite connected to the end connected to the first frame.

9. The transporting device for secondary batteries of claim 8, wherein the protruding part is arranged to contact the pouch cell, and implements a lifting movement of the first frame in response to a change in weight of the pouch cell when in contact or not in contact with the pouch cell.

10. The transporting device for secondary batteries of claim 8, wherein the protruding part has a structure coated with one or more resins selected from epoxy, silicone, styrene-based rubber, butadiene-based rubber, polyurethane, flexible PVC, or polypropylene copolymer.

* * * * *